Oct. 18, 1927.
O. SPAHR
1,645,667
ELECTRIC SADIRON
Filed April 19, 1924
2 Sheets-Sheet 1
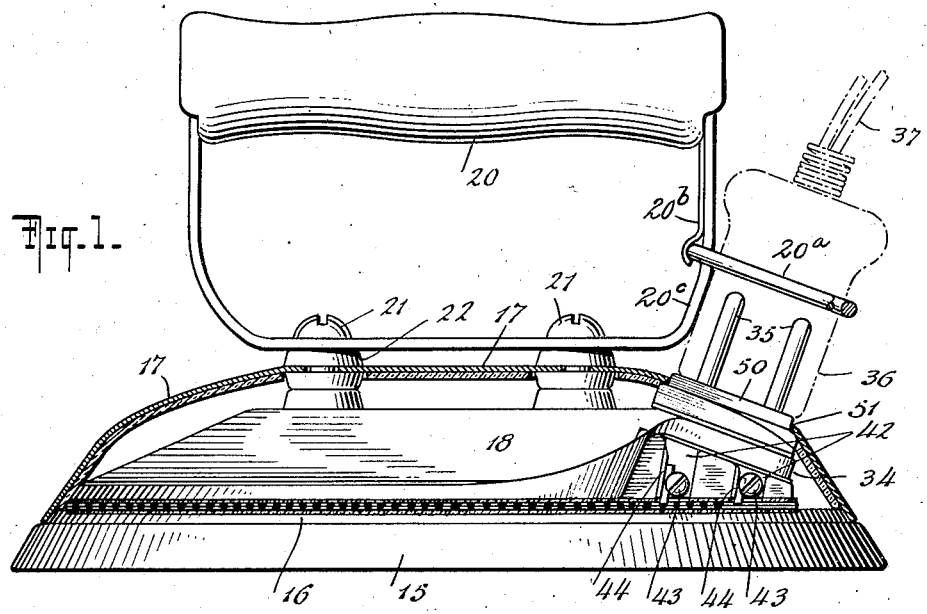
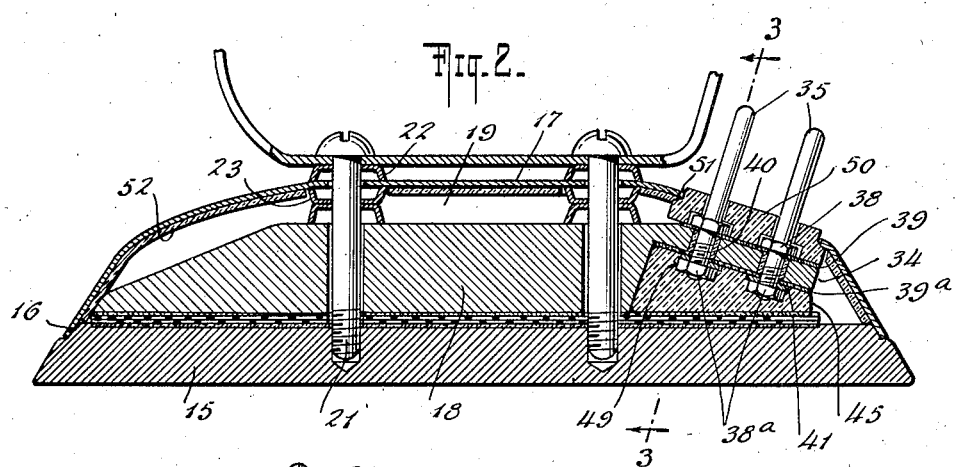
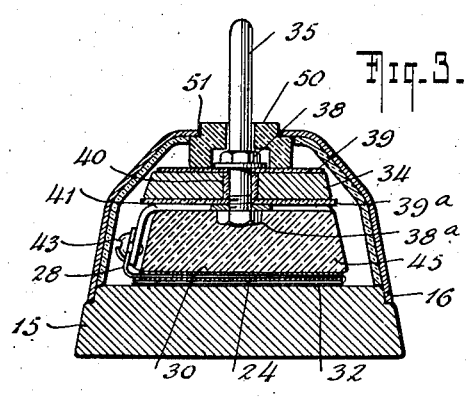
INVENTOR
OTTO SPAHR Oct. 18, 1927.
O. SPAHR
ELECTRIC SADIRON
Filed April 19, 1924      2 Sheets-Sheet 2
1,645,667
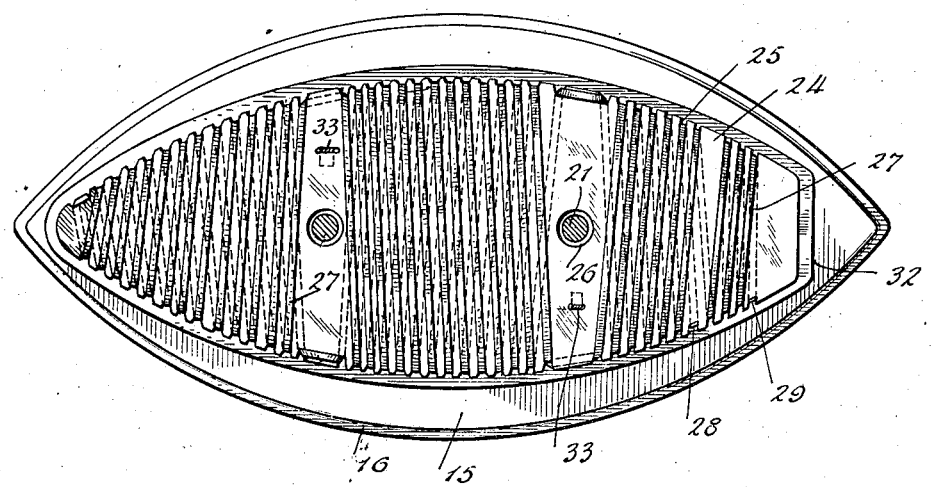
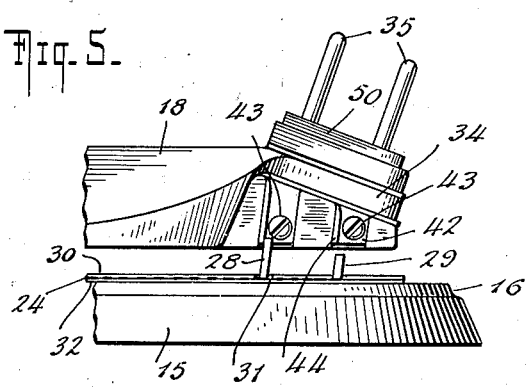
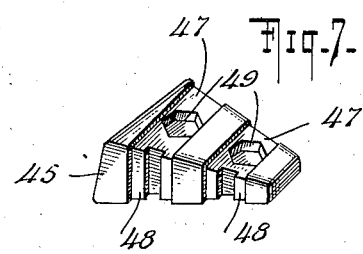
INVENTOR
OTTO SPAHR
BY
ATTORNEYS Patented Oct. 18, 1927.

1,645,667

UNITED STATES PATENT OFFICE.

OTTO SPAHR, OF PHILADELPHIA, PENNSYLVANIA.

ELECTRIC SADIRON.

Application filed April 19, 1924. Serial No. 707,567.

My invention relates to sad-irons of the type in which electricity is the heating medium and has for its object to produce a simple and novel construction in which special provision is made for confining the heat against spreading to such elements of the iron as are intended to remain cool. Other objects of the invention will appear from the description hereinafter.

In the accompanying drawings, which illustrate an example of the invention without defining its limits, Fig. 1 is a side elevation of the iron, with parts in section; Fig. 2 is a longitudinal section thereof; Fig. 3 is a sectional view on the line 3—3 of Fig. 2; Fig. 4 is a plan view with the cover removed; Fig. 5 is a detail view showing parts of the iron separated from each other; Fig. 6 is a fragmentary inverted plan view of the body casting of the iron and Fig. 7 is a perspective view and Fig. 8 is an inverted face view of insulating elements included in the iron.

The iron comprises the base 15, constructed in any customary manner, and having an upright peripheral shoulder 16 over which a metallic shell 17 is fitted. The iron, in addition, includes a metallic casting 18 of suitable shape and size to impart the desired weight to said iron, and located within the shell 17, as shown. An air space 19 is formed between the casting 18 and the shell 17 in order to retard the transmission of heat to said shell. The iron includes further the customary handle 20 for manipulating the same. The parts so far described may be of any conventional type and are secured together by means of screws 21 which pass through suitable openings in the handle 20, shell 17 and casting 18, and screw into internally screw-threaded apertures in the base 15 as shown in Fig. 2. Exterior washers 22 are located between the handle 20 and the shell 17, while interior washers 23 are positioned between the shell 17 and the casting 18, the screws 21 passing through the washers referred to. The heating element which constitutes the active means whereby the iron is heated comprises a sheet 24 of suitable non-conducting material such as mica and having its peripheral edges preferably notched, as indicated at 25. The sheet of material 24 is further provided with screw-apertures 26 for the accommodation of the screws 21 and is of a shape and size to conform to the shape and dimensions of the base 15; a continuous wire or band 27 made of a metal which becomes incandescent by the action of an electrical current flowing therethrough encircles said sheet 24 as shown in Fig. 4. The wire 27 is wound about the sheet 24 in alternate notches 25 from one end of the sheet to the other and then back again to substantially the point of starting in the other alternate notches, the convolutions of the wire being in surface contact with the opposite surfaces of the sheet of insulating material 24. The opposite ends of the wires project perpendicularly to the sheet 24 in spaced relation to each other near one end of the heating element as shown in Figs. 1 and 5 and constitute terminals 28 and 29 whereby the latter is brought into the electrical circuit as will appear more fully hereinafter. It will be noted by reference to Fig. 4 that the convolutions of the wire 27 at points in proximity to the screw apertures 26 are so spaced as to have no contact with the said screws 21 and that at these points the wire 27 extends parallel with and in close proximity to the opposite edges of said heating element. A sheet 30 of insulating material such as mica is located upon the uppermost series of convolutions of the wire 27 and is provided with notches 31 fitting over said terminals 28 and 29, and with screw apertures adapted to register with the apertures 26 for the accommodation of the screws 21. This sheet 30 insulates the uppermost series of convolutions of the wire 27 against contact with the casting 18 and other parts of the iron as will appear more fully hereinafter. One or more sheets 32 of insulating material such as mica are located upon the opposite face of the heating element, that is between the latter and the base 15 in the assembled condition of the iron and serve to insulate the lowermost series of convolutions of the wire 27 from the base 15; said sheet or sheets 32 are likewise provided with screw apertures in registry with the apertures 26 for the accommodation of the screws 21. If desired, the sheets 24, 30 and 32 of the heating element may be fastened together, as by means of wire fastening devices 33.

As shown in Figs. 1, 2 and 3, the casting 18 is cut away at one end to form an overhanging flange 34 upon which a pair of terminals 35, whereby the iron is connected with a source of electricity, are mounted, said terminals being in form of rods extending in perpendicular relation to the flange 34 and being in line with each other in the direction of the major longitudinal axis of the iron. With this arrangement, when the customary plug 36 is attached to the terminals, any pull upon the wires 37 leading from said plug will be efficiently resisted and thus prevent unintentional disconnection of the iron from the source of electricity. The terminals 35 are fixed in place upon the flange 34 by nuts 38 and 38$^a$ which are insulated therefrom by sheets 39 and 39$^a$ of mica or other non-conducting material, sleeves 40 of similar material surrounding said rods where they pass through said flange 34. The inner ends of the rods 35 are connected with metallic members 41 which extend transversely along to the inner surface of said flange 34 or more correctly of the insulating sheet 39$^a$ and are fixed in place by the nuts 38$^a$; the members 41 terminate at one edge of said flange in depending lugs 42 in which binding screws 43 are mounted, as shown in Fig. 1, said lugs being further provided along one upright edge with flanges 44. The binding screws 43 connect the terminals 28 and 29 of the heating element with the lugs 42 and consequently with the members 41 and terminals 35, the flanges 44 serving to guide said terminals 28 and 29 into position beneath the screws 43 in a manner to facilitate the assembling of the parts. After the terminals 28 and 29 have been attached to the lugs 42, the heating element lies in engagement with the lower surface of the casting 19 and is movable therewith as a unit, thus doing away with the necessity for individually manipulating these elements in the assembling of the iron.

For the purpose of protecting the terminals 35 against becoming overheated by the action of the heating element a block 45 of material which is a non-conductor of heat and preferably also of electricity, such as for instance an asbestos composition, is fitted beneath the flange 34 and into an end recess 46 formed in the contiguous end of the casting 18. This block 45 is provided with recesses 47 and 48 for the accommodation, respectively, of the members 41 and depending lugs 42 and further includes recesses 49 adapted to receive the nuts 38$^a$; the block 45 is so dimensioned and shaped as to fit snugly beneath the flange 34 with its lower surface flush with the corresponding surface of the casting 19. The various recesses 47, 48 and 49 are so arranged and proportioned as to fit the respective elements 41, 42 and 38$^a$ closely, the recesses 49 particularly engaging the nuts 38$^a$ with sufficient snugness to prevent the latter from turning and to frictionally unite the block 45 with the flange 34. A block 50 of similar insulating material is provided with suitable apertures 50$^a$ for permitting it to be slipped upon the terminal rods 35 and to rest upon the upper surface of the flange 34 or rather upon the insulating sheet 39 thereon; the block 50 is dimensioned and shaped to fit an opening 51 formed in the shell 17 and so as to project somewhat beyond the latter in the assembled condition of the iron. This block 50 thus serves as an abutment for the end of the plug 36 and prevents the latter and the wires 37 connected therewith from becoming overheated. For the purpose of still further retarding the transmission of heat to the shell 17 and associated elements a sheet 52 of material which is a non-conductor of heat such as asbestos is located within the air space 19; the sheet 52 is preferably fitted upon the interior washers 23 and upon the insulating block 50 and is cut in a manner to fit these elements and to fix it in position against shifting.

To assemble the iron, the nuts 38$^a$ are fitted in to the recesses 49 of the insulating block 45 and the latter is then placed in the end recess 46 of the casting 18 and against the insulation sheet 39$^a$ which in turn is in surface engagement with the lower face of the flange 34 thereof; this automatically positions the nuts 38$^a$ in registry with the openings in said flange through which the terminal rods project. After the insulation sheet 39 has been placed in position upon the upper surface of said flange 34 and the insulation sleeves 40 have been inserted into said openings the terminal rods 35 may be passed therethrough and screwed into the nuts 38$^a$. The latter being held against rotation in the recesses 49 are screwed home upon said rods and against the sheet 39$^a$ and flange 34 to firmly fix said rods in position. After the above operations have been completed, the heating element is combined with the casting 18 by sliding the terminals 28 and 29 beneath the binding screws 43 and then tightening the latter. The slipping of the terminals 28 and 29 beneath the screws 43 is easily accomplished because of the presence of the flanges 44 which act as guides to guide said terminals along the lugs 42 without effort; the described connecting operation may be still further facilitated by making the terminal 28 somewhat longer than the terminal 29, so that one terminal will reach its screw in advance of the other and thereby permit the terminals to be individually manipulated. The unit consisting of the casting 18, the terminals 35 and associated parts, the insulation block 45 and the heating element 24—27 is placed upon the base 15 with the openings for the screws 21 in these elements in registry with each other. The interior washers 23 are then placed upon the casting 18 in registry with said screw openings and the insulation block 50 is slipped over the terminal rods 35 after which the sheet 52 of insulating material is placed in position; the shell 17 is then fitted over the shoulder 16 of the base and the exterior washers 22 are placed upon said shell in registry with the screw openings therein. The handle 20 is then set upon said washers 22 with its screw openings in alignment therewith and the screws 21 are inserted into place and screwed home, thus uniting all of the elements of the iron in an operative assembled condition. The assembling operation is reduced to the simplest form and is easily accomplished without the necessity for any particular skill on the part of the workman.

It will be noted that the terminals 28 and 29 of the heating element are positively connected with the terminals 35 thus avoiding any possibility of sparking or unintentional disconnection.

The insulating block 45 in addition to its function as a heat arrester serves also to hold and centralize the nuts 38 whereby the terminal rods 35 are fixed in place and also to hold and centralize the metallic members 41 and their lugs 42 and thereby simplifies the connection of these elements.

In the preferred arrangement the wire or band 27, which constitutes the active heating means, is so arranged and wound upon the sheet 24 that a greater number of convolutions of said wire are located at the forward end of the heating element than at the rear end thereof. As a result, the toe or point of the iron is heated to a greater degree than is the rear or heel thereof, the latter being maintained in the desired condition of efficiency by conduction. This is a desirable arrangement for the reason that the toe or point of the iron comes into engagement first with the cold surface of the material to be ironed and accordingly requires a higher degree of heating than the rear parts of the iron; the latter come into contact with said surface only after it has been warmed by the fore part of the iron. Furthermore with the described arrangement the terminals and contact points at the heel of the iron are maintained in a cooler condition than is otherwise the case.

The iron may further include a bail 20ª which is pivotally mounted upon the handle 20 and is arranged to encircle the plug 36 and thereby fix it in its normal position on the terminals 35; a spring 20ᵇ may be provided upon said handle for resiliently locking said bail either in the operative position shown in Fig. 1, or in a folded inoperative position when not in use. In the preferred arrangement the one upright member of the handle 20 is formed with an abutment section 20ᶜ which extends in a direction approximately parallel to the plug 36 and is located in close proximity thereto. Thus as a pull is exerted upon the wires 37 the plug 36 will be drawn against the outer end of the bail 20ª and will tend to rock on the terminals 35; this tendency of the plug to rock is resisted by the action of the abutment section 20ᶜ so that the plug is firmly held between the outer end of said bail and said abutment section 20ᶜ and the terminals 35 are accordingly not subjected to the force of the aforesaid pull. As a result of this the possibility of unintentionally disconnecting the plug and the danger of disarranging or injuring the terminals are both obviated.

The iron operates in the well-known way in that the electric current passing through the wires 37 brings the wire 27 of the heating element to a state of incandescence and thereby generates heat, which is transmitted to the base 15 in the well-known way. The air space 19 between the casting 18 and the shell 17 retards the transmission of heat from the casting, which naturally becomes heated in the operation of the iron, to the shell and to the handle 20; the transmission of heat from the casting 18 is further arrested by the insulating sheet 52. The iron may thus be comfortably and conveniently used without the necessity for any handle pads or the like.

The iron is extremely simple in construction and is entirely devoid of any complicated elements likely to become disarranged, and as a result, is economical to produce and to operate. As previously set forth, the iron may be quickly assembled with a minimum of effort and may be easilty taken apart when, for any reason, this is required.

Various modifications in the specific form shown and described may be made within the scope of the claims without departing from the spirit of my invention.

I claim:

1. An electric iron comprising a body, a casting having an end recess, a heating element between said body and casting, a flange extending from the recessed end of said casting, a pair of terminal rods carried by said flange, metallic members extending transversely along the inner surface of said flange whereby said heating element is connected with said terminal rods, an insulating block fitted into said end recess between said flange and heating element to protect said terminal rods against overheating, a shell enclosing said casting, and provided with an aperture, an insulating block mounted upon said terminal rods and projecting through said shell aperture and beyond the same and means for securing said body, casting and shell together.

2. An electric iron comprising a body, a casting, a heating element between said body and casting, a flange at one end of said casting, a pair of terminals carried by said flange, nuts beneath said flange for securing said terminal rods thereon, metallic members extending transversely beneath said flange for connecting said heating agent with said terminal rods, an insulating block fitted beneath said flange to protect said terminal rods against overheating, said block being provided with recesses fitting said nuts and said metallic members respectively, a shell enclosing said casting and means for securing said body, casting, and shell together.

3. An electric iron comprising a body, a casting, a heating element between said body and casting, a flange at one end of said casting, a pair of terminals carried by and extending through said flange and connected on the lower side of said flange with said heating element, an insulating block fitted beneath said flange to protect said terminals against overheating, a shell enclosing said casting, and spaced therefrom, an insulating sheet located between said casting and shell and means for securing said body, casting and shell together.

4. An electric iron comprising a body, a casting having an end recess, a heating element between said body and casting, a flange extending from the recessed end of said casting, a pair of terminal rods carried by said flange, metallic members extending transversely along the inner surface of said flange whereby said heating element is connected with said terminal rods, an insulating block fitted into said end recess between said flange and heating element to protect said terminal rods against overheating, a shell enclosing said casting, and provided with an aperture, an insulating block mounted upon said terminal rods and projecting through said shell aperture and beyond the same, interior washers located between said shell and casting, an insulating sheet fitted over said interior washers and over said last named insulating block between said casting and shell, a handle and screws whereby said handle, shell, casting and body are secured together.

In testimony whereof I have hereunto set my hand.

OTTO SPAHR.